United States Patent Office 3,099,632
Patented July 30, 1963

3,099,632
ADHESIVE COMPOSITIONS
William M. De Crease, Erie, Pa., assignor to Lord Manufacturing Company, Erie, Pa., a corporation of Pennsylvania
No Drawing. Filed Dec. 2, 1959, Ser. No. 856,648
9 Claims. (Cl. 260—3.3)

This invention relates to novel compositions of matter which exhibit unusually prolonged shelf life stability and which possess marked bonding affinity for metals and other solid substrates including polar rubber stocks.

To produce a satisfactory bond between a polar rubber such as neoprene or a nitrile rubber and a solid substrate such as a metal surface, it has hitherto been necessary to apply multiple layers of adhesive therebetween. Although adhesives have been available which were effective to bond these substrates together in a single coat application, the resulting bond would fail upon exposure to severe environmental conditions. The use of multiple layers of adhesive, to avoid this defect, is inconvenient because of the additional number of handling operations involved. The demand in the industry is for one-coat adhesives.

Resistance to severe environments is particularly important when the substrate to be coated with the adhesive or other adherent composition is a ferrous metal substrate, which is subject to corrosion. In severe environments, under bond corrosion becomes a serious problem. This is especially so where a ferrous metal is to be bonded to a substrate such as a halogenated rubber like neoprene. It is reported that, on degradation of rubbers of this nature, hydrogen chloride is released. Moisture dissolving this hydrogen chloride can carry it to the metal substrate and consequently produce corrosion of the metal. By interposing a moisture-proof barrier on the surface of the metal which is resistant to failure in severe environments, the adhesive bond can prevent the deleterious effect of moisture and hydrogen chloride on the metal. The adherent coating may also inhibit corrosion of the metal by an acid scavenging action, which prevents the existence of free hydrogen chloride.

Compositions which are to be used to provide adherent coatings such as adhesive bonds will also desirably have a substantial shelf life in the formulated state. This is particularly difficult to achieve with compositions containing epoxy resins. Such resins tend to react extremely rapidly with most effective curing agents in a single package formulation under storage conditions.

Another property which is important to the utility of such compositions is retention of bondability after application to a first substrate. An appreciable lapse of time may intervene before the coated substrate can be bonded to the other substrate to form an assembly. Unless the adhesive coating maintains its bondability during this interval, flexibility of operation in the process of producing the bonded assembly is hampered.

It is an object of this invention to provide novel compositions having bonding affinity for solid substrates including metals and polar rubber stocks.

A principal object of this invention is to provide an improved adhesive composition for bonding polar rubbers to metal and other solid substrates in a single-coat application to produce a bond exhibiting high resistance to severe environmental conditions.

Another object is to provide a novel single package, time-stable composition comprising an epoxy resin and a curing agent therefor, having a shelf life of substantial duration, and being adapted for use as a surface coating, as an adhesive, and for other surface treatment purposes.

Still another object is to provide a novel adhesive composition which retains bondability for an extended time after application to a first substrate.

Yet another object is to provide a novel composition which has a marked bonding affinity for solid substrates including metals, and coatings of which, bonded to the surface of metals such as ferrous metals, inhibit corrosive attack thereon in severe environments.

These and other objects will become apparent from a consideration of the following specification and claims.

The novel composition of this invention comprises, in its broadest aspect, chlorinated rubber, an epoxylated novolak, and an epoxy resin curing agent.

A curable epoxy resin composition of unusually prolonged time stability is provided by compositions of the stated nature wherein the epoxy resin curing agent is selected from a certain class of such agents, and the composition additionally comprises a mixed solvent system, as further described hereinafter.

A highly effective adhesive is provided by compositions including a bonding phase comprising carbon black and the stated three components—chlorinated rubber, an epoxylated novolak, and an epoxy resin curing agent.

Time-stable adhesive compositions, which form a preferred and particularly advantageous embodiment of this invention, are produced when the stated bonding phase is formulated with a mixed solvent system as set forth more particularly hereinafter.

The novel compositions provided by this invention are unusual and valuable products. The time-stability of the presently provided compositions is a unique characteristic of considerable importance. While epoxy-types resins are widely used for coating and adhesive purposes, their use has been limited and circumscribed hitherto by the inconvenience of having to keep the resin separate from its curing agent until the time of use. The single-package formulation of this invention avoids this inconvenience, thus substantially simplifying and facilitating the user's operations. These time-stable, single-package formulations can accordingly be used to advantage in any of a great variety of the applications of epoxy resins to surface coating and related uses. Thus for example, they are adapted to use as baking enamels and the like. Compositions exhibiting this time stability also form a particularly preferred and advantageous embodiment of the aspect of this invention which comprises the provision of adhesive compositions.

A particular and advantageous property of the adhesive compositions of this invention is the high bonding affinity of their bonding phase for polar rubber substrates, combined with high bond strength to metal and plastic substrates. By virtue of this property, the novel compositions of the invention are effectual one-coat adhesives for bonding such substrates to one another. The bond formed during press-cure molding is generally stronger than the rubber itself; attempts to separate the rubber and substrate result in tearing of the rubber. Moreover, the presently provided adhesives are also characterized by the advantageous property of giving bonds which exhibit excellent resistance to severe environmental conditions. They are particularly valuable as preventatives of underbond corrosion. The coatings produced by these compositions protect metal from attack by corrosive agents produced, for example, in a severe environment by degradation of rubbers bonded thereto or the like.

Additionally, the preferred embodiment of the present compositions, comprising a time-stable adhesive composition, has the advantage of a long shelf life. Moreover, after application to a first substrate and drying, the preferred adhesive coating bonding phase on the substrate retains its bondability for an extended period of time, and thus operations in which it is employed as a bonding agent can be conducted with great flexibility.

A wide variety of substrates can be coated with an adherent protective surface coating utilizing the compositions of this invention, such surface coating comprising, prior to curing, a bonding phase with high bonding affinity for other substrates and adapted for the production of adhesive bonds of high quality where the adhesive compositions of this invention are used to coat the substrate surface. At least one of the substrates coated with composition will be a solid material that will also exist as a solid (including plastic) at the bonding and curing temperatures set forth hereinafter. Metal substrates constitute a class of solid substrates for which the compositions of this invention offer important advantages as a bonding and coating agent. The metallic surfaces which can be effectively provided with an adherent surface coating thereby include both ferrous and non-ferrous materials. Exemplary of such metal surfaces are steel (including stainless steel), aluminum, aluminum alloys, silver, copper, copper alloys (including brass), lead, magnesium, magnesium alloys, and the like. Moreover, the presently provided compositions have a strong bonding affinity for other solid materials, such as formed plastics (synthetic resins) like polyethylene terephthalate, polyamide resins (nylon type), and phenol-formaldehyde resins. Similarly the present compositions may be applied to any of a number of other solid substrates to provide an adherent surface coating. These may include, for example, ceramics, glass, including glass fabric, wood, resin-bonded bodies, textiles, such as those made from synthetic fibers like Dacron (the condensation product of ethylene glycol and dimethylterephthalate), polyamide (nylon type), rayon, and the like.

The bonding phase produced on the selected solid substrate by application of the adhesive compositions of the invention, prior to curing, will have an affinity for other substrate materials of various types, and particularly for materials of high polarity such as polar rubbers. The presently provided adhesive compositions are especially advantageously adapted for the bonding of a metal substrate on the one hand, to a polar rubber on the other, although it is to be understood that they are not limited thereto.

The term, polar rubbers, as used herein, refers to synthetic rubber-like polymers characterized by the presence of recurring functional groups, such as chlorine and nitrile radicals on the polymer chain. Rubbers of this nature are designated herein as polar in distinction from the hydrocarbon rubbers, such as natural rubber, butyl rubber and styrene-butadiene, which can be considered to be non-polar. Neoprene and nitrile rubbers (acrylonitrile-butadiene copolymers) are examples of strongly polar rubbers, and the bonding affinity of the bonding phase produced with the present adhesive compositions is greatest for highly polar rubbers such as these. The adhesive compositions also have a high bonding affinity for certain chlorosulfonated polyethylenes and polysulfide rubbers.

The polar rubber will be in the form of unvulcanized rubber stock when it is to be bonded to a second substrate with the adhesive compositions of this invention. Such stock will contain vulcanizing agents such as sulfur or other curing agents. Accelerators, anti-oxidants, extenders, reinforcing pigments, fillers and colors may also be present in the rubber stock, as it is well known to those skilled in the art. Adhesion of such polar rubber stocks to other substrates to produce a bond with high environmental resistance can be attained using the present adhesive compositions in a single coat application.

The present adhesive compositions can also be used to bond together two solid substrates of the nature noted above, such as metal substrates, in a single coat application.

A multiple coat adhesive application will alternatively be employed under some circumstances. The bonding phase produced by the present adhesive composition, in contrast to its high bonding affinity for polar rubbers, has little or no bonding affinity for non-polar rubbers. Nevertheless, advantages can be attained by utilizing the presently provided compositions to produce assemblies including such non-polar rubbers as one substrate. Thus for instance, because of the environmental resistance of the bonds produced by the present adhesive, metal, coated thereby, is protected from under-bond corrosion. It will therefore sometimes be desirable to employ the compositions of this invention in bonding assemblies which include a substrate having a low bonding affinity for the present adhesive. To accomplish this, the bonding phase provided by the adhesive composition of this invention will be interposed in the assembly adjacent to a substrate for which it has high bonding affinity, such as metal or polar rubber. Adjacent to the non-polar rubber or like substrates for which this bonding phase has less affinity, there will be interposed a cement which does have high bonding affinity for the stated substrate. After press-curing, such an assembly will display the desired high bond strength between the substrates. Moreover, the substrate to which the adhesive composition has been applied as a primer coating will be protected by the resulting bonding layer from attack by degrading influences.

The compositions provided by this invention which exhibit the stated bonding affinity for substrates as listed above each comprise, in the bonding phase thereof, chlorinated rubber, an epoxylated novolak, and an epoxy resin curing agent.

Chlorinated rubber is a well known and readily available material. It is produced by chlorinating a diene polymer. The stated diene polymer may be a natural rubber, or may be any one of a number of synthetic rubbery polymers of conjugated dienes such as poly-1,3-butadiene, poly-2,3-dimethyl-1,3-butadiene, synthetic polyisoprene or the like. Minor amounts of comonomers such as styrene may be utilized in the preparation of the rubbery synthetic polymers to be chlorinated. The chlorination of the rubber is accomplished by methods well understood in the art.

An epoxylated novolak constitutes the second essential ingredient of the composition. This material is specific in its effectiveness in the present use, as distinguished from the epoxy resins derived from bisphenol A and like low molecular weight epoxy resin sources having a maximum functionality of 2. The latter epoxy resins have only a low epoxy equivalency, with an average of 1 to 2 epoxy groups per molecule, whereas the epoxylated novolaks have a higher epoxy equivalency, and are free of the aliphatic hydroxyl groups characteristic of the bisphenol A type epoxy resins. The presently provided adhesive cannot be obtained with the epoxy resins derived from monomers such as bisphenol A.

The epoxylated novolaks are prepared by the reaction of a haloepoxyalkane with a novolak. The novolak resins used in their preparation are well known in the art. They are produced by condensing a phenol with an aldehyde, the phenol being present in excess, in the presence of an acidic catalyst. The phenolic hydroxy radicals of these resins react with a haloepoxyalkane to give the epoxylated novolaks. The haloepoxyalkane employed is typically epichlorohydrin, although it can alternatively be such epoxides as 1-chloro-2,3-epoxybutane, 1-bromo-2,3-epoxybutane and the like. Generally the epoxylation is conducted in alkaline medium such as an aqueous solution of sodium hydroxide. A procedure that may be followed is described in, for example, U.S. Patent 2,716,099. Epoxylated novolaks of the stated nature prepared from phenol, formaldehyde and epichlorohydrin are commercially available, and a resin of this commercially available type, with an epoxide equivalent weight (grams of resin containing a gram equivalent of epoxide) of about 150 to about 190, is a preferred species for use in accordance with this invention.

The third essential ingredient of each of the compositions of this invention will be an epoxy resin curing agent. In its broadest aspects, this may be selected from any of a wide variety of epoxy resin curing agents.

Epoxy resin curing agents are well known to the art. They include diverse materials such as polyamines of different kinds, boron trifluoride complexes, and certain less active curing agents, such as anhydrides and polysulfides, which are generally used in conjunction with accelerators such as amines. The latter type of curing agents, which are characterized as less active, may be used in practicing embodiments of this invention such as the bonding together of two metal surfaces. Thus for example, an anhydride like hexahydrophthalic anhydride, used with an accelerator like α-methyl-benzyldimethylamine, may be employed. However, the times and temperatures required to effect curing with these curing agents are generally higher than those reached in the press-curing of rubber and accordingly, where substrates including polar rubber, for example, are to be bonded in accordance with this invention, the more active epoxy resin curing agents will generally be selected instead.

A variety of amines may be used as the epoxy resin curing agent. One class of such curing agents which are generally characterized by high activity comprises the aliphatic polyamines. Illustrative of these are, for example, ethylenediamine, diethylenetriamine, triethylenetetramine, dimethylaminopropylamine, N-(2-aminoethyl)ethanolamine and the like. If desired, such aliphatic polyamines may be used in combination with one another or with other curing agents such as fatty acid condensates like the reaction product of ethylenediamine with a linoleic acid dimer. Another class of useful amines which are active epoxy resin curing agents comprises aromatic polyamines in which at least two amine radicals are attached to ring carbon atoms of an aromatic nucleus. Illustrative of such aromatic polyamines are polyaminobenzenes such as meta-phenylenediamine, para-phenylenediamine, and mixtures thereof, and polycyclic polyamines such as 3,3'-diaminobiphenyl, methylenedianiline, bis-(aniline)sulfone, methylenebis(ortho-chloroaniline) and so forth. Certain other amine-type compounds such as piperidine, dimethyl-aminopropionitrile and the like can also be used as epoxy resin curing agents if desired. It is also possible to obtain compositions giving good bonds in accordance with this invention where the curing agent is a boron trifluoride complex like boron trifluoride monoethylamine.

To provide the preferred, time-stable epoxy resin compositions of this invention, the epoxy-resin curing agent included in the bonding phase will be selected from the class consisting of meta-phenylenediamine, methylenebis(ortho-chloraniline), and boron trifluoride complexes. It has been discovered that with these specific epoxy resin curing agents, when the bonding phase of the composition is combined with a mixed solvent system having characteristics as set forth hereinafter, there is obtained a fluid composition which has unexpected, novel and commercially useful time stability. The bonding phase retains bondability for a considerable time after the composition is applied to a surface and the solvent allowed to evaporate. Accordingly, such compositions form a particularly preferred embodiment of this invention.

In formulating the preferred, time-stable compositions of the invention, the epoxy resin curing agent selected will preferably comprise meta-phenylenediamine. This may be pure metaphenylenediamine or a mixture of the stated diamine with another curing agent such as para-phenylenediamine. Alternatively, the curing agent may be methylenebis(o-chloroaniline) or a boron trifluoride complex like boron trifluoride monoethylamine.

When the compositions of this invention are to be used as adhesives, the bonding phase thereof will comprise carbon black in addition to the stated chlorinated rubber, epoxylated novolak and epoxy resin curing agent components. Although generally carbon black cannot be tolerated in compositions comprising epoxy resins, with the present formulation it is possible to incorporate it in substantial amounts. This component makes a significant contribution to the unusual advantageous properties of the present adhesive compositions, including particularly an important effect on increasing the stability of the adhesive bond under severe environmental conditions. Generally the carbon black employed will be of the grade usually selected for use in rubber compounding. Good performance as an adhesive is obtained with the compositions of this invention whether the carbon black is neutral, acid or alkali. However, for formulating the preferred, time-stable compositions of this invention, use of a carbon black which is neutral is essential to obtain prolonged shelf life.

Turning now to the proportions in which the above-discussed solid components of the bonding phase of the compositions of the invention are to be combined, the preferred proportions will be those produced by combining about 85 parts by weight of chlorinated rubber, about 15 parts by weight of epoxylated novolak, and about 1.5 parts by weight of epoxy resin curing agent. The amount of chlorinated rubber used may if desired, range from about 70 to about 90 parts by weight. The proportion of epoxylated novolak may be varied within the range of from about 10 to about 30 parts by weight. The amount of epoxy resin curing agent used will desirably be equal to about 10 percent of the weight of epoxylated novolak present in the bonding phase; thus, from about 1 to about 3 parts by weight of epoxy resin curing agent may be employed. In the adhesive compositions of the invention, the bonding phase will include carbon black ranging from about 22 to about 35 parts, and preferably, about 30 parts by weight to 100 parts by weight of combined polymeric components (chlorinated rubber and epoxylated novolak).

Compositions as provided by this invention consisting of the stated bonding phase components, mixed together to form a homogeneous mass, can be applied directly to substrate surfaces and cured to form an adherent coating on a substrate face or a strong adhesive bond between substrates. Most conveniently, however, they will be formulated for use by combining the bonding phase components with a solvent system. The bonding phase components can then easily and readily be deposited as a film on a substrate surface by application of the fluid, solvent-containing composition to the surface and evaporation of the solvent. The total solids content of such solvent-containing compositions may vary somewhat, depending largely on the method of application selected. The solids concentration in the solution may be as low as about 1%, particularly when the solution is to be applied by spraying. It may, however, range well above this figure, even up to about 75% by weight. A concentration in the range of from about 20% to about 24% by weight of the total weight of the composition has been found suitable for formulation of the preferred time-stable compositions of this invention for use as an adhesive, and forms a preferred concentration, particularly for this embodiment of the invention.

Where time stability of the compositions provided hereby is not a consideration of significance, any of a wide variety of solvents may be used to provide fluid compositions containing the bonding phase components of the present novel compositions. Thus for example, the solvent system may comprise a single solvent having the solvency power required to dissolve the organic (including polymeric) bonding phase components, such as a solvent like methyl ethyl ketone, methyl isobutyl ketone, nitropropane and so forth. However, in such case, as is usual in known systems containing an epoxy-type resin and an epoxy resin curing agent in solution together, the stated resin and curing agent react to form a gel on standing at room temperature within a few weeks, at most.

By contrast, it has now been discovered that time stability of a commercial order of magnitude, amounting to ten months to a year or more of shelf life, can be produced when the solvent system comprises a mixed solvent system of certain definite characteristics. These are that the solvent system is a mixture of at least two solvents which differ in their respective solubility parameters by at least 0.3 units, and which are of opposing hydrogen bonding capacity.

That the solvencies of solvents (and the solubilities of polymers) are determined by a combination of their solubility and hydrogen bonding parameters is recognized in the art. To provide useful fluid compositions for application to substrate surfaces, the solvent system used must dissolve the organic components of the composition bonding phase, including its polymeric components. Nevertheless, if time stability is to be produced, the solvent system must tend to keep the epoxylated novolak resin and the epoxy resin curing agent separate. It is believed that this is achieved in accordance with the present invention by virtue of the fact that the mixed solvent system used comprises solvents differing significantly in the stated parameters determinative of their solvency powers. Use of such a mixed solvent system is not alone sufficient, nevertheless, to produce long shelf life. It is also necessary that the bonding phase of the composition be selected as stated hereinabove to result in time stability. Thus, the epoxy resin curing agent will be selected from the class consisting of m-phenylenediamine, methylenebis(o-chloroaniline) and boron trifluoride complexes. Carbon black included in the composition will be neutral, rather than either acid or alkaline. The chlorinated rubber present in all of the compositions of this invention is also believed to contribute to their stability in such a mixed solvent system. On the other hand, even where the compositions are formulated with the components selected as stated, gelation occurs rapidly in a single solvent system. Thus the mixed solvent system has an effect on the reactivity of the bonding phase components. In any case, regardless of theoretical explanations of the significance of the differing solvent parameters, it is found that a mixed solvent system of the stated nature exhibits the property of inhibiting gelation of the epoxylated novolak resin and producing a remarkable and prolonged time stability of the present compositions.

Tabulated solubility parameter values for a large number of liquids useful as solvents are available in the literature. Where a value is not available, it can be calculated for a given liquid from its energy of vaporization. Combinations of solvents differing in solubility parameters by at least 0.3 unit can readily be selected by consulting tables of solvent solubility parameters or the like.

The solubility parameters of solvents in mixtures are approximately additive in proportion to the mol fractions of the solvents. For production of time-stable compositions in accordance with this invention, a mixed solvent system is required which will dissolve the polymeric components of the presently provided composition. Generally, when the solubility parameter of a solvent mixture is approximately the same as that of a given polymer, the solvent mixture will dissolve the polymer. Of the polymeric components of the present compositions, chlorinated rubber has a calculated solubility parameter of 9.4, and the epoxylated novolak has an estimated solubility parameter of about 9.1. For the present purposes, a solubility parameter on the low side of the average of these figures is preferred. It is found that solvency for these polymers is exhibited by solvent systems having a solubility parameter in the range of from about 8.2 to about 9.7, and optimally, in the range of from about 8.9 to about 9.2. A wide variety of solvents can be combined to produce mixtures having a solubility parameter in these ranges. In selecting such combinations of solvents, however, it is also necessary to consider the other characteristic of the presently useful mixed solvent systems, which is that the selected solvents have opposing hydrogen bonding capacities.

Solvents comprising compounds in which a hydrogen atom is attached to an oxygen, nitrogen or fluorine atom are hydrogen-bonding. The hydrogen atom forms a bridge between the atom to which it is attached and another electronegative atom, which may belong to a different molecule. The strength of such bonds decreases in the order F—H—F, O—H—O, O—H—N, N—H—N, and C—H—O. Common solvents can be grouped into general classes as follows: (1) poorly hydrogen-bonded, including hydrocarbons, chlorinated hydrocarbons, and nitrohydrocarbons; (2) moderately hydrogen-bonded, including ketones, esters and ethers; and (3) strongly hydrogen-bonded, such as alcohols. By "opposing" hydrogen bonding capacities of solvents, as referred to herein in describing the presently useful mixed solvent systems, is meant that the mixed solvents shall comprise members of at least two of these three classes. Thus, the solvent system may be a mixture of a member of class (1) and a member of class (2); a mixture of a member of class (2) and a member of class (3); a mixture of members of class (1) and class (3); or a mixture of members of all three classes.

Illustrative of poorly hydrogen-bonded solvents (class 1) are the following solvents, for which solubility parameters are indicated in parentheses: alkanes such as n-heptane (7.4), cyclohexane (8.2) and dipentene (8.5); aromatic hydrocarbons such as benzene (9.2), toluene (8.9, xylene (8.8) and ethylbenzene (8.8); chlorinated hydrocarbons such as carbon tetrachloride (8.6) and o-dichlorobenzene (10.0); and nitrohydrocarbons such as nitropropane (10.7) and nitrobenzene (10.0). Of this class, poorly hydrogen-bonded solvents having a solubility parameter of from about 8.5 to about 9.5, and especially aromatic hydrocarbons having such a solubility parameter, like toluene and xylene, are preferred for the present purposes.

Illustrative of moderately hydrogen-bonded solvents (class 2) are the following, for which solubility parameters are indicated in parentheses: ethers such as 2-methoxyethanol (9.9), diethylene glycol butyl ether (8.9) and dioxane (9.9); esters such as butyl acetate (8.5) and dibutyl phthalate (9.4); and ketones such as diisopropyl ketone (8.0), methyl isobutyl ketone (8.4), methyl ethyl ketone (9.3). Moderately hydrogen-bonded solvents used in preparing the present mixed solvent system will preferably have a solubility parameter of from about 8.5 to about 9.5. Particularly preferred for the present purposes are ketones of this type, like methyl isobutyl ketone and methyl ethyl ketone.

The highly hydrogen-bonded solvents are alcohols, like 2-ethylhexanol (9.5), methyl isobutyl carbinol (10.0) and 2-ethylbutanol (10.5). The figures in parentheses are the solubility parameters of these alcohols.

While mixed solvent systems conforming to the characteristics stated above and producing time-stable compositions can be prepared by appropriate selection of members of any two or more of these classes, for commercial purposes, the mixed solvent system will generally comprise a mixture of a poorly hydrogen-bonded solvent (class 1) and a moderately hydrogen-bonded solvent (class 2), differing in solubility parameters by at least 0.3 unit. The presently preferred mixed solvent system is a mixture of solvents of this nature, in which the solvents each have solubility parameters within the range of from about 8.2 to about 9.7, and comprise respectively an aromatic hydrocarbon and a ketone. Examples of such mixed solvent systems are mixtures such as xylene/methyl isobutyl ketone, benzene/methyl isobutyl ketone, toluene/methyl ethyl ketone, toluene/methyl isobutyl ketone, ethylbenzene/methyl ethyl ketone, and the like. Mixed solvent systems of this nature with a solubility parameter in the range of from about 8.9 to about 9.2, and particularly xylene/methyl ethyl ketone mixtures having such a solubility parameter, form a particularly preferred embodiment of this aspect of the invention.

The solubility parameter of solvent mixtures can be varied by varying the proportions of the solvents in a given mixture. At least ten percent by volume of the solvent mixtures of this invention will consist of a solvent having a hydrogen bonding capacity opposed to that of the remainder of the mixture and a solubility parameter differing by at least 0.3 unit from that of the remainder of the mixture. Usually it will be preferable to use an excess of the more strongly hydrogen-bonded solvent. Thus for example, where the solvent mixture consists of xylene and methyl ethyl ketone, the ketone may comprise from about 60% to about 90% by volume of the mixture. A xylene/methyl ethyl ketone mixture in the proportion, by volume, of about 1:2 is preferred.

The above-stated components constitute the essential ingredients of the compositions of the invention. Additional materials may, however, be introduced therein under certain circumstances, when this can be done without disturbing the balance of the formulation. Thus for example, an additional epoxy resin catalyst which supplements the action of the selected curing agent, additional resin or the like may be included in the composition. Small amounts of dispersing agents, plasticizers, antioxidants, or similar materials, may also be included in some cases.

No particular order need be observed in combining the various ingredients to formulate the compositions of the invention. The components of the adhesive compositions of the invention, containing carbon black, on combination with the solvent system will produce a translucent dispersion in which the solids content is partly but not fully dissolved in the solvent system. To obtain good dispersion of the ingredients, means conventional in the art for producing thorough admixture of multiple component systems, such as high speed stirring systems, like a Kady mill, or the like, may be employed. The resulting dispersion produced using the preferred time-stable adhesive compositions set forth herein will be quite stable and display a remarkably long shelf life.

The compositions of the invention will be utilized by applying the bonding phase thereof, comprising chlorinated rubber, an epoxylated novolak and an epoxy resin curing agent, to the surface of a substrate, and curing the bonding phrase by heating it to a temperature and for a time sufficient to effect reaction of the epoxylated novolak with the curing agent. More particularly, substrates will be bonded together by interposing the bonding phase of the adhesive compositions of this invention between two substrates, and press-curing the assembly. This procedure provides bonded assemblies of unusual strength and resistance to severe environments.

Most conveniently, the compositions used to effect such bonding will comprise a solvent system in addition to the bonding phase. An adhesive composition of this nature will be applied to the surface of one of the substrates, such substrate being a solid, and the solvent allowed to evaporate from the composition to leave a coating of the bonding phase on the substrate surface.

In general the solid substrate to which the adhesive is applied will be a metal surface. The metal surface is preferably cleaned and freed from loose oxide scale. This may be accomplished by any convenient method of the wide variety of cleaning procedures well known to those skilled in the art. For example, the surface may first be degreased by dipping the article in degreasing solution or by subjecting the metal surface to the vapors of a degreasing material such as trichloroethylene. After this degreasing operation the metal may be further cleaned by blasting the surface with conventional material such as steel shot, grit, sand or the like. Where the surface of the solid substrate is other than metallic, it will be subjected instead to cleaning and preparative procedures appropriate to its nature: for example, a plastic such as Mylar may be prepared by wiping with a solvent. In many cases, no special treatment will be necessary.

The present composition may be applied to the solid substrate by any of a variety of conventional techniques such as spraying, dipping, brushing, wiping or the like. The surface coated with the adhesive composition is then allowed to stand exposed to the air so that the solvent components of the adhesive composition can evaporate off leaving a coating or film of the adhesive components on the solid substrate. A dry film thickness of approximately 0.001 inch is normal but films between 0.0003 inch and 0.003 inch have given good results, and even wider variation in the film thickness could have utility under certain circumstances. The adhesive may be dried to produce the film coating on the substrate at room or at elevated temperature; it dries quickly even at room temperature. In any case, the adhesive composition will be allowed to reach a state of substantial dryness. The resulting coating is hard and has good resistance to handling during processing and storage. It may be bonded immediately, as soon as it is non-tacky. The coated substrates produced by application of the preferred compositions of this invention, which are time-stable, retain bondability for a considerable time after drying, and can be held for at least 30 days at room temperature without sacrificing bondability.

When the material to be bonded to the adhesive-coated solid substrate is an uncured polar rubber, which is an application for which the compositions of this invention are particularly adapted, the polar rubber stock is merely contacted with the coated substrate and the assembly subjected to a pressure cure. The cure cycle will be determined by the requirements of the stock being molded. In general, temperatures ranging between about 230° and about 350° F. will be employed with the type of polar rubber stock used in the industry, the duration of the cure time generally ranging from about 10 to about 60 minutes. The presently provided adhesive gives good bonds with both the short and long cures over a wide molding temperature range. The pressure employed may also vary and may be as low as that merely required to provide intimate contact, that is, a few pounds per square inch. The upper limit of pressure is not critical and pressures as high as a few thousand pounds per square inch may be employed. The present bonding agent works well in both compression and transfer molding operation, in continuous vulcanization units and wrapped roll cures. The bonds have excellent hot strength to help in removing parts from molds. Effective bonds can even be obtained with hot air or open steam cures by use of a tack cement made from the stock being bonded.

Substantially similar procedure will be followed when the solid substrate coated with the adhesive is to be bonded to any other surface to which the adhesive exhibits bonding affinity. As noted above, the adhesive can also be used to advantage as an environmentally resistant primer, particularly when the manufactured article is to be exposed to severe environments and situations where underbond corrosion is a problem. In such case, where the adhesive has insufficient bonding affinity to the type of material to be adhered to the substrate, it will be applied as a primer to the substrate as described above. Thereafter, as soon as the surface of the adhesive has become dry, a secondary cement coat for the development of tack or for bonding to non-polar stock will be applied. Such cements will be selected for their bonding affinity to the non-polar rubber or other material which is to be bonded to the solid substrate. Generally, any suitable rubber cement will exhibit bonding affinity for the presently provided adhesive. The assembly will then be cured by heating under pressure as hereinabove described.

Where the preferred compositions of the invention are to be used to form protective coatings on surfaces rather than an intermediate bonding phase adhered to a second substrate, the procedure to be followed in applying it to the surface to be coated will be substantially as described above. Cure of the coating will then be produced by exposing the coated surface to temperatures of from about 200° to about 350° F., in a baking oven or the like.

The present invention will be more clearly understood from a consideration of the following specific examples which are given for the purpose of illustration only and are not intended to limit the scope of the invention in any way.

EXAMPLES I–XXI

An adhesive solution was prepared by combining 85 parts by weight of chlorinated natural rubber having a viscosity as a 20% solution in toluene at room temperature of 125 cps., 15 parts by weight of an epoxylated novolak having a viscosity of 60,000 cps. and an epoxide equivalent weight of 175–182, 1.5 parts by weight of meta-phenylenediamine, and 30 parts by weight of carbon black. These solids were dissolved and dispersed to by 2:1 by volume mixture of methyl ethyl ketone and xylene to provide a formulation having a solids content of 20–24%.

The following examples illustrate the excellent bond having high environmental resistance obtained in a single coat application of this adhesive composition wherein a variety of polar rubber stocks are bonded to metal substrates.

In each case, the rubber stock employed were freshly milled before bonding. The adhesive was applied to degreased and grit blasted steel parts by dip application. After the adhesive coating had dried, the adhesive-coated steel was contacted with the prepared rubber stocks over one square inch of surface and a bond was formed by compression molding at 307° F. for 40 minutes.

Adhesion was tested by a modified version of the rubber metal peel test described in ASTM D–429–55T, Method B, at room temperature and at 250° F. Results are reported in terms of percent of surface covered by rubber upon failure. With the present adhesive composition, the bond holds firm, and tearing occurs in the rubber rather than in the bond over substantially the entire surface of the test pieces.

The bonded parts were also exposed to various severe environments. The test pieces were prepared by tying back the rubber so that the adhesive interface was presented to the environment. A strong peel force was thus exerted on the bonded area during exposure to the environment. After conclusion of the test, hand peeling was used to test the strength of the bond, and the percentage of rubber coverage on the bonded area at failure was recorded. Under such severe conditions even the best bonds show deterioration, whereas in the unstressed state many will last indefinitely without being damaged. As will be evident from the following data, the present adhesive gives bonds which hold firm even under these severe conditions.

EXAMPLES I–V

The data presented in the following table show the ability of the presently provided adhesive composition to give tight bonds to stocks made from both sulfur (GN–A) and non-sulfur (WRT and W) modified types of neoprene stocks. Tearing in the rubber is obtained when parts are tested at both room and elevated temperature. The bonds are retained after being stressed in adverse environments.

TABLE I
NEOPRENE STOCKS

| Example | I | II | III | IV | V |
|---|---|---|---|---|---|
| Neoprene type GN–A | 100.0 | 100.0 | | | |
| Neoprene type WRT | | | 100.0 | 100.0 | |
| Neoprene type W | | | | | 100.0 |
| N-phenyl-α-naphthylamine (antioxidant) | 2.0 | 2.0 | 2.0 | 2.0 | 2.0 |
| Magnesium oxide | 4.0 | 4.0 | 2.0 | 2.0 | 4.0 |
| Stearic acid | | | 1.0 | 0.5 | 0.5 |
| Petroleum | 2.0 | | | | 1.0 |
| Black-SRF [1] | 60.0 | | | | 35.0 |
| Black-EPC [2] | | 75.0 | | | |
| Black-MT [3] | | | 70.0 | 140.0 | |
| Naphthenic oil | 10.0 | 10.0 | 15.0 | 10.0 | 10.0 |
| Zinc oxide | 5.0 | 5.0 | 5.0 | 5.0 | 5.0 |
| Sulfur | | | 0.5 | 0.5 | |
| 2-mercaptoimidazoline | | 0.3 | | | 0.5 |
| Di-o-tolylguanidine salt of a dicatechol borate | 1.0 | | 0.5 | 0.5 | |
| Cure, minutes at 307° F | 40 | 40 | 40 | 40 | 40 |
| Hardness (Shore A) | 60 | 80 | 44 | 60 | 47 |
| Modulus at 100% elong. (p.s.i.) | 850 | 200 | 400 | 200 | 410 |
| Modulus at 300% elong. (p.s.i.) | 2,000 | 1,100 | 1,700 | 600 | 1,400 |
| Tensile strength (p.s.i.) | 2,250 | 2,690 | 1,600 | 1,650 | 2,600 |
| Elongation (percent) | 275 | 525 | 388 | 630 | 370 |

ASTM PEEL TEST

| | | | | | |
|---|---|---|---|---|---|
| Pounds per inch at room temp | 125 | 99 | 106 | 97 | 63 |
| Percent rubber coverage | 100 | 100 | 100 | 100 | 100 |
| Pounds per inch at 250° F | 33 | 39 | 23 | 27 | 17 |
| Percent rubber coverage | 100 | 100 | 100 | 100 | 100 |

ENVIRONMENTAL TEST

| PERCENT RUBBER COVERAGE STRESSED SAMPLES | | | | | |
|---|---|---|---|---|---|
| Steam autoclave, 40 min. at 260° F | 90 | 100 | 100 | 99 | 100 |
| ASTM #3 oil, 24 hours at 300° F | 100 | 95 | 100 | 85 | 100 |
| Salt spray, 48 hours at 100° F | 100 | 85 | 100 | 90 | 100 |
| Hot water, 2 hours at 212° F | 100 | 100 | 100 | 100 | 100 |

[1] A semi-reinforcing, natural gas type furnace carbon black.
[2] An easy processing channel carbon black.
[3] A thermatomic carbon black.

EXAMPLES VI–IX

The data presented in the following table show the ability of the presently provided adhesive to form good bonds with stocks made from base polymers comprising acrylonitrile-butadiene rubbers of all levels of nitrile content.

TABLE II
NITRILE STOCKS

| Example | VI | VII | VIII | IX |
|---|---|---|---|---|
| Hycar 1001 high acrylonitrile | | | | |
| Hycar 1042 med. high acrylonitrile | | 100.0 | | |
| Hycar 1043 medium acrylonitrile | | | 100.0 | |
| Hycar 1014 low acrylonitrile | | | | 100.0 |
| Zinc oxide | 5.0 | 5.0 | 5.0 | 5.0 |
| Sulfur | 1.5 | 1.5 | 1.5 | 1.5 |
| Stearic acid | 1.0 | 1.0 | 1.0 | 1.0 |
| Black-SRF (Furnace carbon black) | 65.0 | 65.0 | 65.0 | 65.0 |
| Dioctyl phthalate | 15.0 | 15.0 | 15.0 | 15.0 |
| Tetramethylthiuram monosulfide | 0.4 | 0.4 | 0.4 | 0.4 |
| Cure, Minutes at 307°F | 40 | 40 | 40 | 40 |
| Hardness (Shore A) | 68 | 65 | 64 | 59 |
| Modulus at 100% elong. (p.s.i.) | 490 | 370 | 320 | 270 |
| Modulus at 300% elong. (p.s.i.) | 2,310 | 1,700 | 1,580 | 1,400 |
| Tensile strength (p.s.i.) | 2,590 | 2,330 | 2,050 | 2,050 |
| Elongation percent | 350 | 450 | 400 | 420 |

ASTM PEEL TEAT

| | | | | |
|---|---|---|---|---|
| Pounds per inch at room temp | 113 | 143 | 119 | 77 |
| Percent rubber coverage | 100 | 100 | 100 | 100 |
| Pounds per inch at 250° F | 24 | 33 | 30 | 32 |
| Percent rubber coverage | 100 | 100 | 100 | 100 |

ENVIRONMENTAL TEST

| PERCENT RUBBER COVERAGE STRESSED SAMPLES | | | | |
|---|---|---|---|---|
| ASTM #3 oil, 7 days at 158° F | 90 | 100 | 100 | 95 |
| Ethylene Glycol, 7days at 158° F | 50 | 100 | 90 | 95 |
| Gasoline, 14 days at room temperature | 100 | 100 | 100 | 100 |
| Hot water, 2 hours at 212°F | 100 | 50 | 100 | 100 |

EXAMPLES X–XIII

The data presented in the following table show the ability of the presently provided adhesive to give tight bonds to nitrile rubber stocks in the presence of several different plasticizers.

Table III
NITRILE STOCKS

| Example | X | XI | XII | XIII |
|---|---|---|---|---|
| Hycar 1042 med. high acrylonitrile | 100.0 | 100.0 | 100.0 | 100.0 |
| Zinc oxide | 5.0 | 5.0 | 5.0 | 5.0 |
| Sulfur | 1.5 | 1.5 | 1.5 | 1.5 |
| Stearic acid | 1.0 | 1.0 | 1.0 | 1.0 |
| Black-SRF (furnace carbon black) | 65.0 | 65.0 | 65.0 | 65.0 |
| Dioctyl phthalate | | 15.0 | | |
| Liquid nitrile plasticizer [1] | | | 15.0 | |
| Coumarone-indene resin plasticizer | | | | 15.0 |
| Tetramethyl thiuram monosulfide | 0.4 | 0.4 | 0.4 | 0.4 |
| Cure, Minutes at 307° F | 40 | 40 | 40 | 40 |
| Hardness (Shore A) | 75 | 65 | 67 | 68 |
| Modulus at 100% elong. (p.s.i.) | 620 | 370 | 280 | 350 |
| Modulus at 300% elong. (p.s.i.) | 2,550 | 1,700 | 1,340 | 1,590 |
| Tensile strength (p.s.i.) | 2,800 | 2,330 | 2,430 | 2,380 |
| Elongation (percent) | 360 | 450 | 600 | 560 |

ASTM PEEL TEST

| | | | | |
|---|---|---|---|---|
| Pounds per inch at room temp | 153 | 143 | 150 | 161 |
| Percent rubber coverage | 100 | 100 | 100 | 100 |
| Pounds per inch at 250° F | 36 | 33 | 54 | 39 |
| Percent rubber coverage | 100 | 100 | 100 | 100 |

ENVIRONMENTAL TEST

| PERCENT RUBBER COVERAGE STRESSED SAMPLES | | | | |
|---|---|---|---|---|
| ASTM #3 oil, 7 days at 158° F | 100 | 100 | 95 | 100 |
| Ethylene glycol, 7 days at 158° F | 100 | 100 | 95 | 90 |
| Gasoline, 14 days at room temperature | 100 | 100 | 100 | 100 |
| Boiling water, 2 hours at 212° F | 100 | 50 | 100 | 100 |

[1] A low molecular weight acrylonitrile-butadiene polymer.

EXAMPLES XIV–XXI

The procedure described in the preceding examples was followed, employing varied types of solid substrates. In each case, the surface of the solid substrate was prepared as indicated in Table IV, a single coat of the adhesive composition was applied by dipping, and after the coating of the adhesive had dried on the surface, freshly milled neoprene WRT stock of the type used in Example IV was applied thereto and press cured at 307° F. for 40 minutes. It was then tested by the ASTM rubber-metal peel test noted above. The data obtained and presented herein below illustrate the versatility of the presently provided adhesive. In each case the bonded part failed in the rubber and not in the bond.

Table IV
VERSATILITY

| Example | Substrate | Surface preparation | Peel value, lb./in. | Percent rubber coverage |
|---|---|---|---|---|
| XIV | Steel | Grit blasted | 126 | 100 |
| XV | Stainless steel | do | 113 | 100 |
| XVI | Aluminum | do | 122 | 100 |
| XVII | Brass | do | 121 | 100 |
| XVIII | Silver plated brass | Degreased only | 113 | 100 |
| XIX | Copper | Grit blasted | 121 | 100 |
| XX | Lead | Steel wool rubbed | 100 | 100 |
| XXI | Mylar [1] | Solvent wiped | 98 | 100 |

[1] Polyethylene terephthalate.

EXAMPLES XXII–XXIX

These examples illustrate the variations which may be made in formulating the compositions of the invention, and the criticality of the choice of components of ratios set forth in describing the present invention.

EXAMPLE XXII

A composition as employed in Examples I–XXI was prepared, but substituting an epoxylated novolak of lower viscosity than the epoxylated novolak used therein, this epoxylated novolak having an epoxide equivalent weight of 172–178. The composition gave bonds similar to those described in the preceding examples.

EXAMPLE XXIII

For the meta-phenylene diamine of the composition employed in Examples I–XXI, there were substituted, respectively, methylenebis(ortho-chloroaniline) and boron trifluoride monoethylamine. The resulting compositions are stable in storage, and could be used to produce bonds comparable to those produced by the meta-phenylene diamine.

EXAMPLES XXIV–XXIX

Compositions were formulated in which components of the bonding phase were omitted or used in proportions varying from those employed in the preceding examples, as indicated in the following table. From the results of bond strength tests as shown in the table, it will be evident that compositions departing substantially from the compositions of the invention do not give comparable results.

Table V

| Examples | XXIV | XXV | XXVI | XXVII | XXVIII | XXIX |
|---|---|---|---|---|---|---|
| Chlorinated nat'l rubber [1] | 70 | 70 | 50 | 90 | 90 | 85 |
| Epoxylated novolak [2] | 30 | | | 50 | 10 | |
| Epoxylated novolak [3] | | 30 | | | 10 | 15 |
| Meta-phenylene-diamine [4] | 3 | 3 | 3 | 3 | 3 | +5 |
| Carbon black [5] | | | | | 30 | 30 |
| Methyl ethyl ketone | 300 | 300 | 300 | 300 | 300 | 300 |
| Xylene | 150 | 150 | 150 | 150 | 150 | 150 |

ASTM PEEL TEST [6]

| | XXIV | | XXV | | XXVI | | XXVII | | XXVIII | | XXIX | |
|---|---|---|---|---|---|---|---|---|---|---|---|---|
| | Lbs./in. | Percent R. | Lbs./in. | Percent R. | Lbs./in. | Percent R. | Lbs./in. | Percent R. | Lbs./in. | Percent R. | Lbs./in. | Percent R. |
| Room temp | 79 | 75 | 90 | 75 | 63 | 5 | 131 | 100 | 106 | 98 | 115 | 100 |
| 50° F | 24 | 75 | 27 | 75 | 22 | 0 | 40 | 75 | 43 | 100 | 50 | 100 |
| Steam Autoclave (40 min. at 260° F.) | | 50 | | 25 | | 50 | | 85 | | 100 | | 100 |

[1] Viscosity at 20% solids in toluene at 25° C.: 125 cps.
[2] Epoxide equivalent 172–178; viscosity: 1,200 cps. at 125° F.
[3] Epoxide equivalent 175–182; viscosity: 60,000 cps. at 125° F.
[4] 80–90% concentration.
[5] A neutral thermatomic carbon black.
[6] Values reported as pounds per square inch (lb./in.) pull and percent of failure in rubber (percent R).

When an epoxy resin of the conventional type (bisphenol A-derived) is substituted for the epoxylated novolak, the bond produced fails in some cases even in the peel test, at below 250° F., and in the environmental test, the bonds fail in 1–2 hours in the hot water test.

When a phenolic resin is substituted for the epoxylated nonolak in the adhesive composition, failure of the bond before reaching the 250° F. temperature has also been observed. In the room temperature test, furthermore, in many cases, the failure occurs completely or largely in the bond.

The necessity that the adhesive composition be formulated as herein defined if the particular advantages of the present invention are to be attained will accordingly be evident.

While the invention has been described with reference to particular preferred embodiments thereof, it is to be appreciated that modifications and variations can be made within the scope of the foregoing description and the following claims.

I claim:
1. A time-stable composition of matter adapted for use as an adhesive comprising:
   (I) a bonding phase consisting essentially of:
       (a) chlorinated natural rubber;
       (b) epoxylated novolak;
       (c) an epoxy resin curing agent selected from the class consisting of meta-phenylenediamine and methylene bis (orthochloroaniline); and
   (II) a mixed solvent system consisting essentially of at least two solvents which:
       (a) differ in their respective solubility parameters by at least 0.3 unit;
       (b) are selected from at least two of the following three classes:
           (1) a poorly hydrogen-bonding solvent selected from the class consisting of hydrocarbons, chlorinated hydrocarbons and nitrohydrocarbons;
           (2) a moderately hydrogen-bonding solvent selected from the class consisting of ketones, esters and ethers, and
           (3) a strongly hydrogen-bonding solvent selected from the class consisting of primary, secondary and tertiary alcohols.

2. The composition of claim 1 in which said solvent system is a mixture of an aromatic hydrocarbon and a ketone.

3. The composition of claim 2 where said epoxy resin curing agent is meta-phenylenediamine.

4. The composition of claim 3 where said mixture of solvents is a mixture of methyl ethyl ketone and xylene.

5. The composition according to claim 1 in which said bonding phase comprises from about 70 to about 90 parts by weight of chlorinated natural rubber, from about 10 to about 30 parts by weight of an epoxylated nonolak, and from about 1 to about 3 parts by weight of epoxy curing agent.

6. The composition according to claim 1 including a neutral carbon black.

7. The composition according to claim 6 in which said bonding phase comprises from about 22 to about 35 parts by weight of a neutral carbon black.

8. The composition according to claim 1 in which said mixed solvent system consists essentially of methyl ethyl ketone and xylene in a volume ratio of 2:1 respectively.

9. A time-stable, adhesive composition of matter comprising from about 20 to about 24% solids content, said solids content comprising about 85 parts by weight of chlorinated natural rubber, about 15 parts by weight of an epoxylated novolak, about 1.5 parts by weight of meta-phenylenediamine and about 30 parts by weight of a neutral carbon black, and the remainder liquids content, said liquids content comprising methyl ethyl ketone and xylene in a volume ratio of 2:1 respectively.

References Cited in the file of this patent
UNITED STATES PATENTS 2,648,613    Shinkle _____ Aug. 11, 1953
2,886,473    Schroeder _____ May 12, 1959

OTHER REFERENCES

Narracott: "British Plastics," October 1951.